US011176540B2

(12) United States Patent
Gupta

(10) Patent No.: US 11,176,540 B2
(45) Date of Patent: Nov. 16, 2021

(54) CARD-TO-CARD DIRECT COMMUNICATION

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/807,279

(22) Filed: Mar. 3, 2020

(65) Prior Publication Data

US 2021/0279717 A1 Sep. 9, 2021

(51) Int. Cl.
*G06K 5/00* (2006.01)
*G06Q 20/34* (2012.01)
*G06K 7/10* (2006.01)
*G06Q 20/22* (2012.01)

(52) U.S. Cl.
CPC ....... *G06Q 20/352* (2013.01); *G06K 7/10237* (2013.01); *G06Q 20/223* (2013.01); *G06Q 20/341* (2013.01)

(58) Field of Classification Search
CPC ............. G06Q 20/352; G06Q 20/3278; G06Q 20/341; G06Q 20/354; G06Q 20/327; G06K 19/045; G06K 19/0703
USPC ................ 235/380, 382, 383, 387, 492, 379
See application file for complete search history.

(56) References Cited

U.S. PATENT DOCUMENTS

| | | | | |
|---|---|---|---|---|
| 7,128,274 B2* | 10/2006 | Kelley | ............... | G06Q 20/3278 235/492 |
| 8,256,667 B2* | 9/2012 | Poznansky | ............. | G06K 19/12 235/380 |
| 8,880,028 B2* | 11/2014 | Han | .................... | H04M 1/7253 455/411 |
| 9,864,944 B2 | 1/2018 | Radu et al. | | |

(Continued)

OTHER PUBLICATIONS

Scott Thornton, "NFC Basics: How to Use for Programming Automation," https://www.microcontrollertips.com/programming-automation-using-nfc-tags-faq/, May 31, 2018.

(Continued)

*Primary Examiner* — Daniel St. Cyr
(74) *Attorney, Agent, or Firm* — Weiss & Arons LLP; Michael A. Springs, Esq.

(57) ABSTRACT

A method for performing a card-to-card direct contactless transaction between a first active smart card and a second active smart card, each comprising an active near-field communication ("NFC") reader. The method may include activating the first active smart card by receiving input of a personal identification number ("PIN") on a keypad located on the first active smart card, verifying the PIN and further receiving input of a transaction amount on the keypad. The method may further include initiating a wireless NFC communication to perform the transaction by positioning the first active smart card within a pre-determined distance to the second active smart card and confirming accuracy of each of the first and second active smart card using the active NFC reader to retrieve card ID data and confirm accuracy. Following confirming, the method may include completing the transaction using the first active smart card and a payment network.

16 Claims, 6 Drawing Sheets

(56) References Cited

U.S. PATENT DOCUMENTS

| | | | |
|---|---|---|---|
| 10,621,574 B1* | 4/2020 | Rao | G06Q 20/363 |
| 2019/0286805 A1 | 9/2019 | Law et al. | |
| 2020/0034830 A1* | 1/2020 | Ortiz | G06Q 20/3678 |

OTHER PUBLICATIONS

"Contactless Smart Card," https://en.wikipedia.org/wiki/Contactless_smart_card, Wikimedia Foundation, Inc., Dec. 22, 2019.
Robert Triggs, "What is NFC and Does it Work," https://www.androidauthority.com/what-is-nfc-270730/, Android Authority, Retrieved on Jan. 27, 2020.
"How Does NFC Work," https://www.bluebite.com/nfc/how-does-nfc-work, Blue Bite LLC, Oct. 15, 2019.
Adithya Venkatesan, "How Things Work: NFC Can Be Active or Passive," https://thetartan.org/2014/9/15/scitech/howthingswork, The Tartan Carnegie Mellon's Student Newspaper, Sep. 14, 2014.
Near Field Communication (NFC), https://www.geeksforgeeks.org/near-field-communication-nfc/, Geeks For Geeks, Retrieved on Jan. 27, 2020.
"Near-Field Communication," https://en.wikipedia.org/wiki/Near-Field_communication, Wikimedia Foundation, Inc., Jan. 20, 2020.
"Stored-Value Card," https://en.wikipedia.org/wiki/Stored-value_card, Wikimedia Foundation, Inc., Jan. 25, 2020.
Nathan Chandler, "What's an NFC Tag?" https://electronics.howstuffworks.com/nfc-tag1.htm, HowStuffWorks, a division of InfoSpace Holdings LLC, Retrieved on Jan. 27, 2020.

* cited by examiner

CARD-TO-CARD DIRECT COMMUNICATION

FIELD OF TECHNOLOGY

Aspects of the disclosure relate to a smart card with enhanced communication features.

BACKGROUND OF THE DISCLOSURE

Cards that are used for performing transactions including financial transactions, purchasing products, gift cards, mass transit and personal identification, may include, embedded in the card, multiple methods of performing the transactions. These cards include, but are not limited to, one or more of a magnetic stripe that can be swiped at a card reader device, a Europay, Mastercard and Visa ("EMV") chip to be inserted into a device and a near-field communication ("NFC") chip for a contactless transaction.

NFC is a rapidly growing, short-range and wireless technology. Cards that include an NFC chip are enabled to passively transfer information stored on an NFC tag within the card to an NFC-enabled device, i.e.—smartphone, point-of-sale device. These cards typically do not include a battery. The cards are powered by a signal received from an active NFC-enabled device when the two are in near proximity. The signal provides sufficient power to the card to enable the card to passively transmit the information to the active NFC-enabled device. The active NFC enabled device can then retrieve the passively transferred information.

These cards may be labeled as 'smart' cards. Conventional smart cards rely upon other devices to make a transaction. However, when an individual needs to make a payment to another individual, the POS device or other suitable device is typically required for completing the transaction.

Therefore, it would be desirable to enable one smart card to directly communicate with the second active smart card. It would further be desirable to enable the pair of smart cards to communicate with one another and complete the transaction between the two.

SUMMARY OF THE DISCLOSURE

Aspects of the disclosure relate to systems and methods for performing a card-to-card direct contactless transaction between a first active smart card and a second active smart card. The first active smart card may be an initiator of the transaction. The second active smart card may be a recipient of the transaction.

The method may include activating the first active smart card to perform a secure transaction with the second active smart card. The activating may include receiving input of a personal identification number ("PIN") on a keypad located on the first active smart card. The activating may also include verifying the PIN being associated with the first active smart card. The verifying may be prior to activating the first active smart card. The verifying may be enabled by using a microprocessor embedded in the first active smart card.

In response to the activating, the method may include receiving input of a transaction amount on the keypad. The method may also include storing the transaction amount on the first active smart card.

The method may further include initiating a wireless NFC communication between the first active smart card and the second active smart card. Each of the first active smart card and the second active smart card may include an active NFC reader. The active NFC reader may be enabled to be active by using a battery embedded in each of the first and second active smart card.

The initiating may include positioning the first active smart card within a pre-determined distance to the second active smart card. Exemplary NFC communication ranges may be 0-1 inches, 0-1.5 inches, 0-2 inches, 0-2.5 inches, 0-3 inches, 0-3.5 inches, 0-4 inches, 0-4.5 inches, 0-5 inches, or any other suitable range supported by NFC apparatus.

The method may also include ensuring a security of the wireless NFC communication between the first active smart card and the second active smart card. The ensuring of the security may be enabled by the first active smart card confirming the card ID data associated with the second active smart card and the second active smart card confirming the card ID data associated with the first active smart card. The data may be retrieved from an NFC tag embedded in each of the first and second active smart card. The card ID data may include non-sensitive identification data associated with a cardholder of the card and the card itself.

The confirming may include retrieving card ID data associated with the second active smart card. The retrieving may be enabled using the active NFC reader associated with the first smart card. Following the retrieving, the method may include acknowledging and confirming the card ID data associated with the second active smart card. The acknowledging and confirming may be enabled using a microprocessor embedded in the first active smart card.

In certain embodiments, for the first active smart card, the acknowledging and confirming may include comparing the card ID data of the second active smart card to a list of card ID data stored on the first active smart card and then verifying that the card ID data is included in the stored list. The stored list may be a pre-determined list of recipients. It should be appreciated that the stored list may be altered and updated in real-time. In the event that the card ID data is not included in the stored list, the method may include terminating the wireless communication between the first and second active smart cards.

In certain embodiments, for the first active smart card, the acknowledging and confirming may further include communicating with the payment network to confirm a validity of the card.

In other embodiments, for the first active smart card, the acknowledging and confirming further may include a manual authentication. The manual authentication may include displaying a name of a cardholder associated with the second active smart card on the display of the first active smart card. Using the keypad, a cardholder of the first active smart card may authenticate the second active smart card.

The second active smart card may then retrieve card ID data associated with the first active smart card using the active NFC reader associated with the second active smart card. Following the retrieving, the method may include acknowledging and confirming the card ID data associated with the first active smart card. The acknowledging and confirming may be enabled using a microprocessor embedded in the second active smart card. The second active smart card may also confirm the transaction amount.

In certain embodiments, for the second active smart card, the acknowledging and confirming may include comparing the card ID data associated with the first active smart card to a list of card ID data stored on the second active smart card and then verifying that the card ID data is included in the stored list. In the event that the card ID data is not included in the stored list, the method may include terminating the wireless communication between the first and second active smart cards.

In certain embodiments, for the second active smart card, the acknowledging and confirming further may include communicating with the payment network to confirm a validity of the card.

In other embodiments, for the second active smart card, the acknowledging and confirming may include displaying non-sensitive identification data of a cardholder associated with the first active smart card on the display of the second active smart card. Using the keypad, the method may include receiving authentication by the cardholder of the second active smart card.

In response to the acknowledging, the method may include completing the transaction using the first active smart card and a payment network.

Following the completion of the transaction, the method may also include receiving a confirmation from the first active smart card of the completion of the transaction.

The method may also include transmitting the confirmation from the microprocessor to a display on the keyboard, via a display connector and further displaying, on the display, a message confirming a completion of the transaction.

In certain embodiments, the first and second active smart card may include a light embedded in the card. The light may be in the form of a light-emitting diode ("LED"). The light may preferably not alter the size of a standard card size. The light may be powered by the battery included in each of the first and second active smart card. When the wireless communication is initiated, the light may emit a red color indicating that a transaction may be in progress. When the transaction is complete, the light may emit the color green. This may indicate a completion of the transaction.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
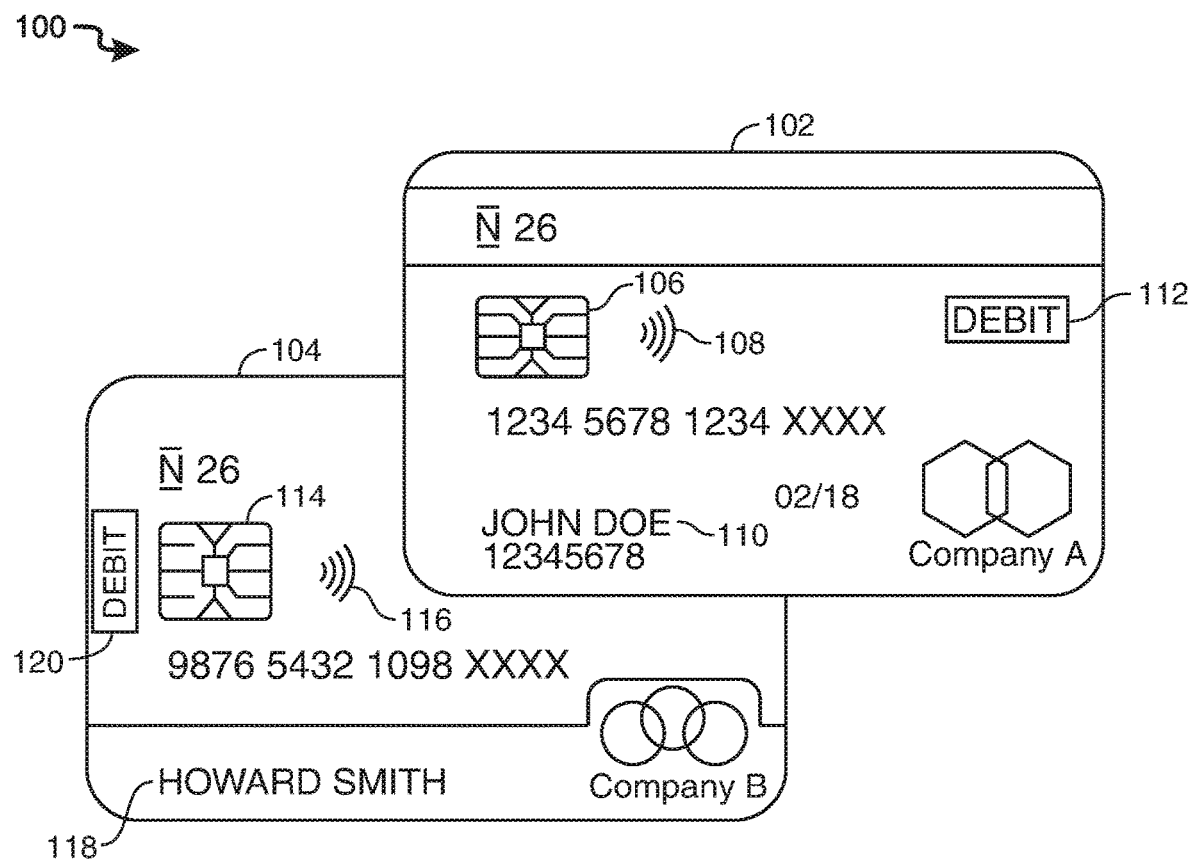
FIG. 1 shows an illustrative diagram in accordance with principles of the disclosure.

A smart card contactless payment system is provided. The system may enable one smart card to directly communicate with a second active smart card. Smart cards, for purposes of the disclosure, may include one or more types of payment instruments. The payment instrument may include, but may not be limited to, a credit card, debit card, ATM card, phone payment card, stored-value card and gift card.

The direct communication between the first active smart card and the second active smart card may enable a completion of a transaction between the first and second active smart card. The direct communication may be enabled using near-field communication ("NFC") technology. NFC standards cover communications protocols and data exchange formats. NFC standards are based on existing RFID standards including ISO/IEC 14443 and FeliCa. The standards include ISO/IEC 18092 and those defined by the NFC Forum.

NFC may be a standard for wireless data transition and may adhere to certain specifications in order to be able to communicate properly with each other. Similar to other wireless signals like Bluetooth and Wi-Fi, NFC works by sending information over radio waves. The NFC technology may be based on radio-frequency identification ("RFID") that may use electromagnetic induction in order to be able to transmit information. Bluetooth connections may be enabled to transmit data up to about 10 meters from the source. NFC communications may be enabled to exchange data up to about 4 inches from the source. The connectivity of a first and second device may be a faster connection when using NFC.

NFC may operate at 106 Kbps, 212 Kbps and 424 Kbps. NFC may transmit at a speed of 13.56 megahertz ("Mhz"). NFC data is transmitted in an NFC Data Exchange Format (NDEF), using the Simple NDEF Exchange Protocol (SNEP). SNEP uses a Layer 2 logical Link Control Protocol (LLCP). This may be connection-based to provide reliable data delivery.

Since the radio frequency ("RF") signals in a communication using NFC have a limited distance, hacking may be very difficult. A potential hacker may be required to be within a few meters distance to be able to attempt hacking the device.

There may be two classifications of NFC devices. A first classification of NFC devices may be passive NFC devices. A second classification of NFC devices may be active NFC devices. Smart cards in connection with a POS terminal, store products, and interactive signs may all be passive NFC devices. Interactive signs and advertisements may also be passive NFC devices. Passive NFC devices may include an NFC tag that stores data but does not have power. These tags are powered when in contact with an active NFC device.

A point-of-sale ("POS") device may be the active NFC device. POS devices may include POS devices at touch payment terminals, card readers at public transport locations, smartphones, ipads, tablets and any other mobile device.

Passive NFC devices may not be able to process any information that may be sent from other sources. Passive NFC devices may also not be able to connect to other passive NFC devices.

These passive NFC devices may include an NFC tag which may enable an active NFC enabled device, when in close proximity, to extract the data stored on the NFC tag using radio waves. They may not include a power source such as a battery and may only gain power when an active NFC device comes in close range to the tag using electromagnetic induction. This mode may be an NFC read-write mode. The read-write mode may enable the active device to read information from the passive device. The read-write mode may be a one-way communication.

For example, when an individual desires more details of a product located in a store, the individual may position his personal mobile device in close range to the NFC tag. The mobile device may be an active NFC device and when the mobile device is within close range, the NFC tag may be powered by an electromagnetic field produced by the mobile device.

Additionally, when a smart card is within range of a POS device to perform a transaction, the smart card is powered and may release data to the POS device. After receiving the data release, the POS device may complete the transaction.

Aspects of the invention may include embodiments of both a first and second active smart card. Both the first and second active smart card may be active NFC devices. Each of the first and second active smart card may include an active near field communication ("NFC") reader. The active NFC reader may enable a direct communication between the first active smart card and the second active smart card. When the first active smart card is in proximity to the second active smart card, the two smart cards may be directly enabled to exchange data and perform transactions. The direct communication may be independent of a POS device.

The card-to-card direct payment system may preferably preclude the need for an additional smart mobile device involved in a transaction between the two devices. Accordingly, this eliminates the extra step of swiping the card at the POS terminal. Additionally, by enabling a direct communication from one smart card to another smart card, the chance of potential attacks and threats may be mitigated, at least because of the close proximity that may be necessary in order to copy sensitive data. The smart card may only need to communicate with the second active smart card and the payment network. The smart cards may include a hard-wired security system with multiple layers of encryption and may only have access to the payment network. When communicating with a mobile device and/or any other form of a POS device and/or ATM, the level of security of the smart cards may be reduced since mobile devices and other POS devices may be connected and linked to many other network connections and online applications.

It should be appreciated that a contactless transaction between the first and second active smart card may be performed when the proximity of the two smart cards may be equal to or less than a distance of four inches. This may be within approximately a 10 centimeter ("cm") range.

In certain embodiments, the first active smart card may be an initiator of a transaction. The second active smart card may be a recipient of the transaction. Each of the first and second active smart card may be a payment instrument. Each of the first and second active smart card may include NFC to enable a contactless communication.

Both the first and second active smart card may also include an NFC tag. The NFC tag may include an antenna. The NFC tag may be for storing data associated with the smart card and can further store data associated with a transaction. The NFC tag may be a re-writable tag. The NFC tag may also enable each of the first and second active smart card to perform as passive NFC devices when preferred.

When both the first and second active smart card are active NFC devices they may communicate in an active peer-to-peer ("P2P") mode. The active P2P mode may be a two-way communication. The active P2P mode of communication may enable utilizing the first active smart card as a passive NFC device when transferring card ID data and the second active smart card as an active NFC device when retrieving and processing the card ID data. Both the devices may generate the radio waves alternately and share information and card ID data.

This P2P mode of communication may enable two smart cards to communicate and directly complete a transaction without the need of a POS device.

For example an individual may wish to make a payment to a friend. The individual may want to transfer funds from his smart card and debit it to his friend's card. The funds may be a donation. The funds may be a loan. The funds may be a gift. Because both cards are active NFC-enabled devices, the two smart cards may communicate and execute the transaction.

In accordance with principles of the disclosure, the individual may position his smart card within 4 inches of the recipient's smart card. The close range may enable NFC to activate the cards to perform the transaction. The individual may input an amount of funds into the keypad of his card that he desires to debit to the recipient's card. The two smart cards may perform a handshake. The handshake may enable each card to acknowledge and authenticate the other card. Once authenticated, the smart card performing the transaction may communicate with a payment network in order to complete the transaction.

Each of the first and second active smart card may also include a nano wireless network interface card ("NIC"). The nano wireless NIC may be both smaller and approximately 15% thinner than the Micro SIM (3FF) standard as well as the Mini SIM (2FF) cards. The nano wireless NIC may enable establishing a wireless connection to a Wi-Fi device. When the first active smart card is the initiator and the second active smart card is the target, the two cards may exchange information and the initiator may solely complete the transaction with the payment network. The communication between the card and the payment network may be performed by the microprocessor embedded in the card using a WI-FI connection.

The smart card may operate in a networked environment. The smart card may support establishing network connections to one or more remote computers. Such remote computers may be nodes on a network. The nodes may be personal computers or servers that include many or all of the elements described above relative to the smart card. The network connections may include a local area network ("LAN") and a wide area network ("WAN"), and may also include other networks. When used in a LAN networking environment, the smart card may be connected to the LAN through a network interface or adapter. The communication circuit may include the network interface or adapter.

It will be appreciated that the network connections shown are illustrative and other means of establishing a communications link between devices may be used. The existence of any of various well-known protocols such as TCP/IP, Ethernet, FTP, HTTP and the like is presumed, and the smart card can be operated in a client-server configuration to permit a user to retrieve web pages from a web-based server. Web browsers can be used to display and manipulate data on web pages.

The smart card and network nodes may include various other components, such as a battery, speaker, and antennas (not shown). For example, network nodes may be portable devices such as a laptop, tablet, smartphone or any other suitable device for receiving, storing, transmitting and/or displaying relevant information.

The smart card may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The smart card may utilize computer-executable instructions, such as program modules, being executed by a computer. Generally, program modules include routines, programs, objects, components, data structures, etc. that perform particular tasks or implement particular abstract data types. The smart card may be operational with distributed computing environments where tasks are performed by remote processing devices that are linked through a communications network. In a distributed computing environment, program modules may be located in both local and remote computer storage media including memory storage devices.

Both the first and second active smart card may also include a microprocessor. The microprocessor may enable processing, storing and transmitting card ID data. The microprocessor may further enable communicating with a payment network. The payment network may handle the payment authorization and settlement. The payment network may be included in the system. The payment network may include a payment gateway. The payment gateway may connect with an acquirer's bank and an issuer's bank. The payment network may be configured to receive card ID data from the first active smart card, process the card ID data and complete the transaction.

Both the first and second active smart card may also include a battery. The system may also include a solar pad configured for charging the battery.

It should be appreciated that in embodiments in which both the first and second active smart card are active NFC devices, they may both use a battery when performing in an active mode.

Each of the first and second active smart card may also include a keypad. The keypad may include a display and numerical keys. The numerical keys may be configured to accept input of a personal identification number and a transaction amount. The keypad may be embedded on the smart card and may not entail changing the size of the standard card size. In accordance with the ID-1 of ISO/IEC 7810 standard, smart card size may be defined as 85.60× 53.98×0.76 mm (3.370×2.125×0.030 in).

The keypad may include slightly raised numerical keys and may be responsive to actuation by a touch of a finger. It should be appreciated that the numerical keys may be raised no more than the level of the embossed characters on any smart card. The standard credit card such as a Visa or MasterCard is 0.030" (30 mil) thick in areas of embossment. Most embossed cards are 0.030" or 0.024" thick.

It should be appreciated that the keypad may be deactivated when not in use. In certain embodiments, the keypad may be activated by a touch of any key on the keypad. The keypad may be responsive to actuation by a stylus. In other embodiments, to protect the smart card from being accessed by an outsider and/or from being pressed on unintentionally, the keypad may require input of one or more pre-determined numerical keys in order to activate the keypad.

Additionally, the active NFC reader may also be powered-off. In order to perform a transaction with the first active smart card and a second active smart card, a PIN may be required to be inputted in the first active smart card in order to activate the active NFC reader.

The system may also include a Wi-Fi device. The WI-FI device may enable the first active smart card to connect to the payment network in order to complete the transaction.

In some embodiments, a method for performing a direct contactless transaction between a first active smart card and a second active smart card is provided. The first active smart card may be an initiator of a transaction. The second active smart card may be a target of the transaction. The method may include activating the first active smart card to perform the transaction. The activating may include receiving, on a keypad at the first active smart card, input of a personal identification number ("PIN"). Prior to activating, the keypad may be locked. The method may include unlocking the keypad by receiving input of a pre-determined set of numbers on the keypad. This step may be an extra layer of security to ensure that only the cardholder may be enabled to use the card. This may also serve as a protection in the event that the keys on the keypad are depressed unintentionally.

The method may further include verifying the PIN being associated with the first active smart card. The verifying may be enabled by a microprocessor embedded in the first active smart card.

Subsequent to the verifying, the method may include receiving input on the keypad of an account number associated with the recipient. The method may also include receiving input on the keypad of a transaction amount.

The method may also include transmitting card ID data including the transaction amount, the account number and card ID data associated with the first active smart card to a payment network. The card ID data may include a cardholders name and identifying information to enable authenticating the card. It should be appreciated that the transmitting of the card ID data to the payment network may be independent of a point-of-sale ("POS") device.

The method may include verifying, using the payment network, the card ID data and the recipient of the transaction.

In response to the verifying, the method may include completing the transaction between the first active smart card and the second active smart card, using the first active smart card and the payment network.

In certain embodiments, the first active smart card may be at a first location. The second active smart card may be at a second location. The first and second location may be situated at a distance greater than 10 inches. The two locations may be in different cities and/or countries. Since the smart card includes a keypad and a controller to share and communicate the input with the microprocessor on the smart card, the smart card may be enabled to execute the transaction solely with the payment network.

The microprocessor embedded in the first active smart card may enable a completion of the transaction independent of the second active smart card.

In certain embodiments, the system may enable storing one or more account numbers that may be associated with one or more pre-determined recipients of a transaction. The system may accept input of the one or more account numbers using the keypad. The system may verify and authenticate each of the recipients and then store, on the smart card, the account number and in some embodiments a unique identification number and/or PIN associated with the recipient.

For example, when a transaction with a commonly used account is performed, the account number and associated data may be stored on the card. A user of the smart card may be enabled to enter the unique identification number and/or PIN associated with the recipient and complete the transaction. In this example, the distance between the initiator of the transaction and the target of the transaction may be greater than the maximum range for NFC. The communication and exchange of data may, in certain embodiments, not require the use of NFC. Because the card may include the microprocessor and the keypad, the smart card, for the purposes of performing transactions, may perform as a mobile device and be enabled to complete transactions independent of a POS device.

When the first active smart card is activated to perform a transaction with the second active smart card, prior to receiving the card ID data from the first active smart card, the second active smart card may need to be activated. The activating may include receiving input of a PIN associated with the second active smart card and verifying the PIN being associated with the second active smart card using the microprocessor embedded in the second active smart card.

In certain embodiments, a smart card may be a stored-value ("SV") card. A stored-value card may differ from a credit or debit card. An SV card may store a monetary value directly on the card itself and may not be connected to any bank payment network. The funds may be withdrawn and deposited directly to the card itself. The funds and any other data may be physically stored on the card. The monetary value may be accessed using mechanisms used on smart cards including but not limited to magnetic stripe, EMV and NFC.

In this embodiment, SV cards may be active NFC devices. The SV card may include an active NFC reader. The SV card may be enabled to perform a direct transaction with another SV card when within a maximum range of 4 inches.

The SV card may also include a keypad configured to receive input of a transaction amount, PIN and account number. The SV card may also include a microprocessor. The microprocessor may enable communication between the SV card and a payment network. The payment network may establish the connection to the necessary banks to complete the transaction.

The SV card may also include a battery. Since the SV card, in certain embodiments, may be an active NFC device, the card may need power to send and receive data.

SV cards that may include active NFC may be enabled to send and receive money from one active NFC enabled SV card to another active NFC enabled SV card. For example, a cardholder of an SV card may wish to give money to another individual. The money may be a gift, loan and/or a payment. If the individual has an active NFC enabled SV card, the two SV cards may position the cards within 4 inches of one another or any other suitable range supported by NFC apparatus, and complete the transaction.

The process may include the cardholder of the first SV card to activate and verify that he is the cardholder by inputting a personal PIN number, via the keypad, on the SV card. The SV card may authenticate the cardholder. The cardholder may then input a transaction amount, submit the amount, via the keypad and the data may be transmitted to the second SV card. In this example, since all the monetary value is directly stored on the SV card, the SV card may not need to access the payment network. The transaction may be completed directly between the two cards. The monetary value may be adjustable and rewritable directly on the card itself.

It should be appreciated that in certain embodiments the communication and execution of a transaction may be vendor-specific. The first SV card and the second SV card may be configured to communicate when issued by the same vendor. This may be detected by implementing an encryption scheme between the two SV cards. The cards may not be enabled to communicate and/or share data and exchange monetary value when not from the same vendor.

Since the active NFC enabled SV card includes an embedded keypad, it may also be implemented for transmitting a monetary value to a bank account and submit payment for a purchase when the SV card is not within close proximity to a POS device. In this embodiment, the SV card may need to use the NIC to establish a WI-FI connection in order to be able to communicate with a payment network. In this embodiment the SV card may be a cash card and may not be vendor based.

Additionally, in accordance with principles of the disclosure, can transmit payment from an account to an SV card. The sender may communicate with a payment network and payment gateway and the SV card may only have to acknowledge the receipt of the payment. The monetary value of the card may change independent of any bank account.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows an exemplary diagram 100 of two active smart cards in close proximity to each other. The two smart cards may be directly communicating with one another. The first active smart card 102 and the second active smart card 104 may be active NFC enabled devices. This direct communication may be independent of any intermediary device.

The first active smart card 102, in this exemplary diagram 100, may be a debit card, as shown at 112. Card 102 may include an EMV chip 106 and an NFC symbol 108. Debit card 102 may belong to a user 'John Doe', as shown at 110.

The second active smart card 104, in this exemplary diagram 100, may also be a debit card, as shown at 120. Debit card 104 may include an EMV chip 114 and an NFC symbol 116. Debit card 104 may belong to a user 'Howard Smith,' as shown at 118.

The NFC symbols 108 and 116 both signify that the debit card can be used in a contactless transaction. It should be appreciated that in this exemplary diagram 100, debit cards 102 and 104 are both active NFC enabled devices. These active NFC enabled devices may include active NFC readers that may enable the two debit cards to exchange information and complete a contactless transaction independent of any POS device.

Figure 2:
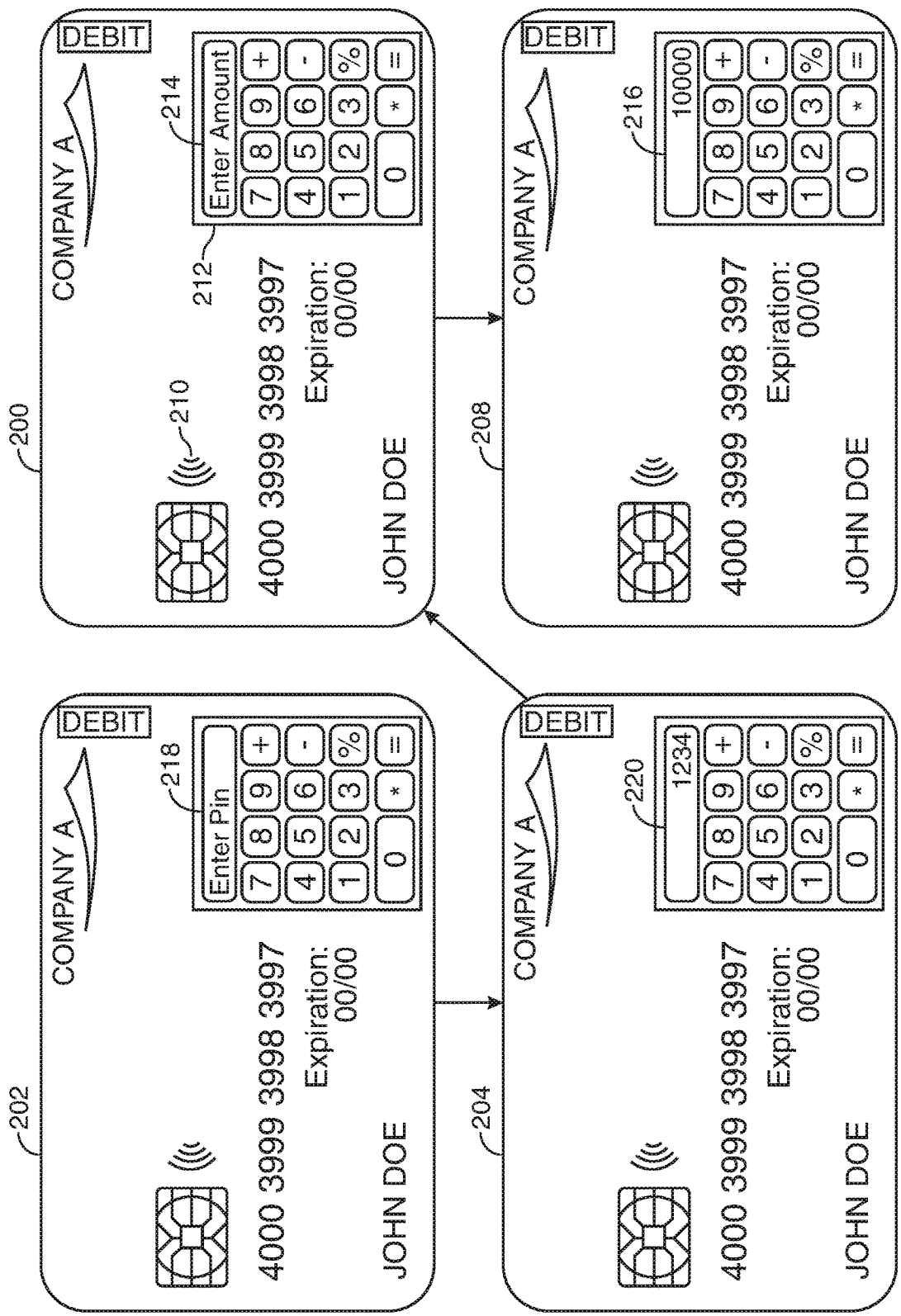
FIG. 2 shows another illustrative diagram in accordance with principles of the disclosure.

FIG. 2 shows an exemplary diagram of a debit card 200 as an initiator of a transaction between the debit card 200 and a second active smart card (shown in FIG. 2).

Debit card 200 displays an NFC symbol at 210 identifying the card to be an NFC enabled card. The NFC hardware embedded in debit card 200 may be hardware that enables the card to operate as an active NFC enabled device.

Debit card 200 may include a number pad 212 configured for receiving input of a transaction amount and a PIN.

Debit cards 202, 204, 206 and 208 may be the same smart card. Each of debit cards 202-208 display a step in the process of entering the card ID data and authenticating the debit card prior to performing the transaction.

As shown at 202, prior to attempting to use the debit card for any form of a transaction, input of a PIN may be required in order to active the card. A user interface may be included on the keypad and may display the text 'enter pin,' as shown at 218.

It should be appreciated that the debit card 200 may be in a powered-off state when not in use. Prior to any form of a trigger for input of a pin number, the card may require a form of a touch on the card and/or on the keypad in order to be in a powered-on state. A user may press on any number on the keypad in order to turn on the card. In certain embodiments, a user may be required to press a specific number on the keypad in order to turn on the card. This may provide an additional layer of theft prevention to the card and enable the card to be more secure.

At 204, the PIN 220 may be inputted via the keypad. Using a microprocessor embedded in the debit card, the PIN may be verified and the debit card may be activated for use in a transaction.

At 206, the display may prompt input of a transaction amount shown at 214. At 208, a transaction amount of 10000 is displayed at 216.

Following the authentication of the pin number, when a second card is positioned in as close proximity as approximately 4 inches to the debit card 200, a transaction of a payment of $10000 may be completed and transferred from debit card 200 to the second card.

Figure 3:
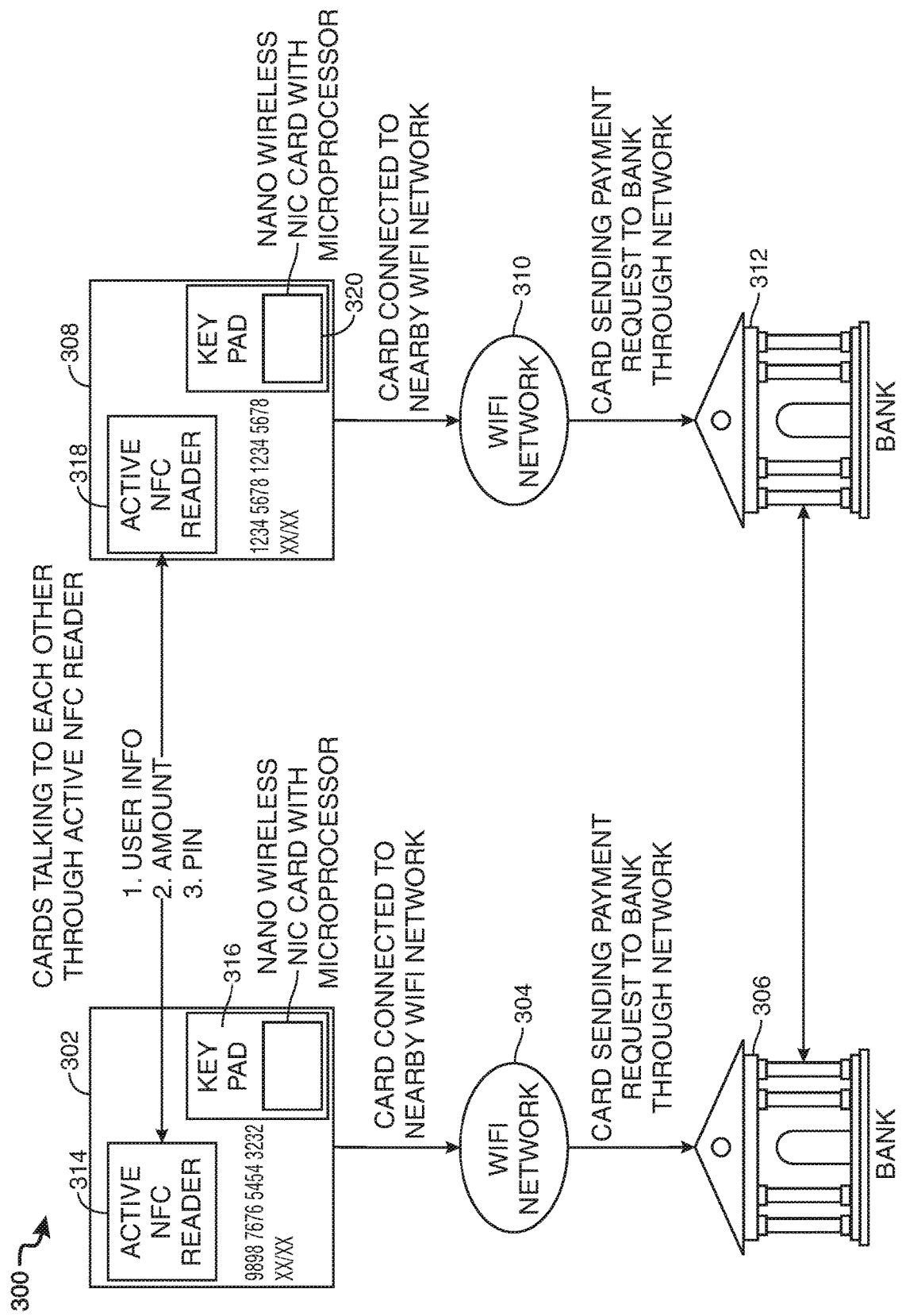
FIG. 3 shows an exemplary diagram in accordance with principles of the disclosure.

FIG. 3 shows an illustrative diagram 300 of two cards directly communicating with one another in order to complete a transaction. In one exemplary embodiment, card 302 may be the initiator and card 308 may be the target. In another exemplary embodiment, card 308 may be the initiator and card 302 may be the target.

Card 302 may be a smart card that includes an active NFC reader 314. Card 302 may also include a keypad 316. Card 302, in this example, may be enabled to communicate with a second card 308 in order to perform a transaction. Card 308 may also include an active NFC reader 318 and a keypad 320.

Each of cards 302 and 308 may include a nano wireless NIC. The card may also include a microprocessor. The NIC may enable the cards to connect to a payment network using nearby WI-FI 304 and 310.

Cards 302 and 308 may require input of a PIN into the keypad in order to activate the card to communicate with the other card and perform a transaction. When activated, the cards may be enabled to communicate with each other using the active NFC reader embedded in the card. Card ID data including user information, a transaction amount and in some embodiments, a pin number, may be exchanged between cards 302 and 308 using the active NFC reader.

When card 302 is the initiator, card 302 may complete the transaction through the payment network. The payment network may include both the issuer's bank 306 and the acquirer's bank 312.

When card 308 is the initiator, card 308 may complete the transaction through the payment network. The payment network may include the issuer's bank 312 and the acquirer's bank 306.

Figure 4:
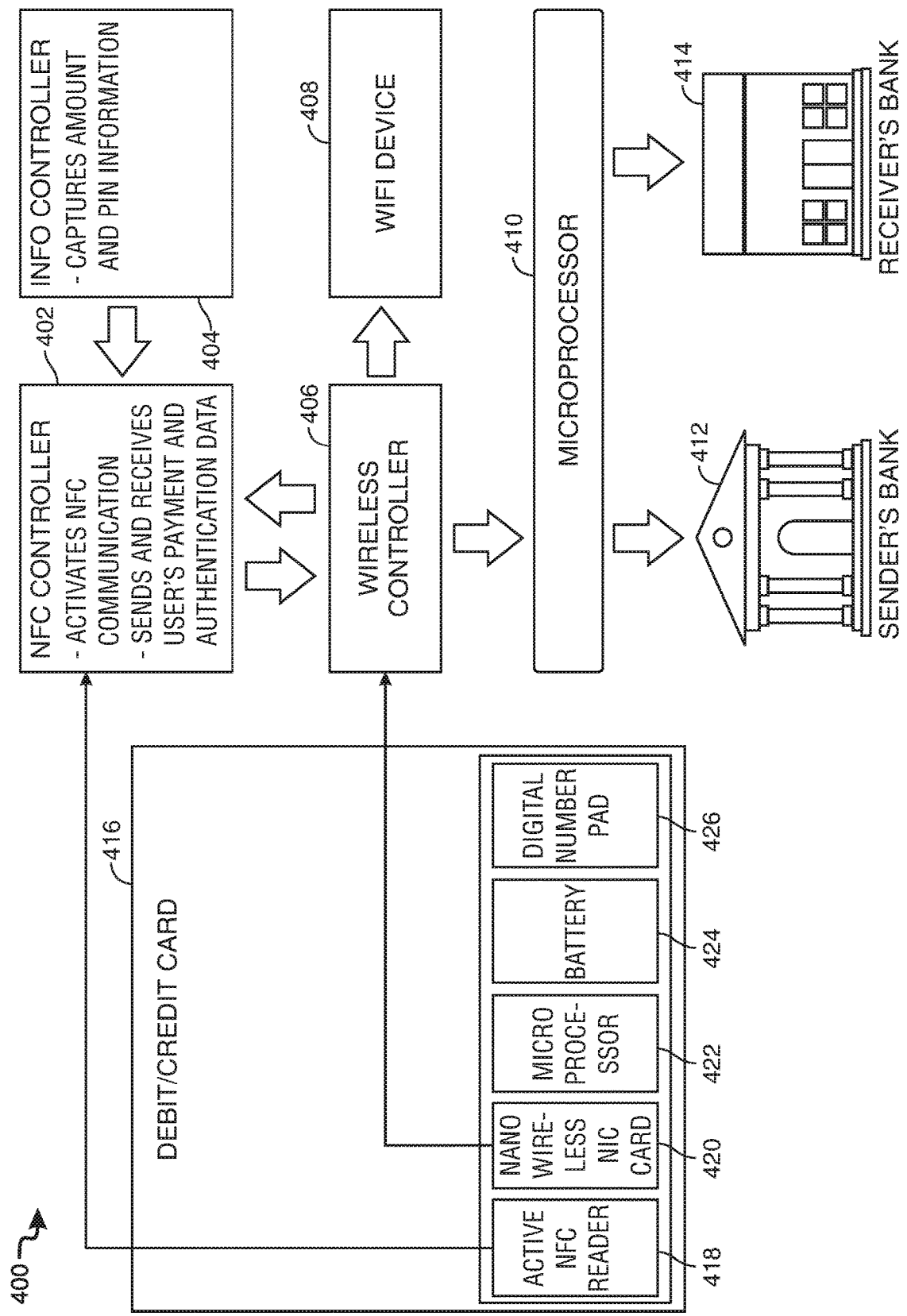
FIG. 4 shows an illustrative architecture in accordance with principles of the disclosure.

FIG. 4 shows an architecture of a smart card 400 that includes an embedded active NFC reader in accordance with principles of the disclosure. Smart card 416 may be configured to directly communicate with a second active smart card (not illustrated.) Smart card 416 may include both NFC hardware and software to enable the smart card to perform as an active NFC device.

Smart card 416 may include an active NFC reader 418. Smart card 416 may also include a nano wireless NIC 420 and a microprocessor 422. Smart card 416 may also include a battery 424. Smart card 416 may also include a keypad 426. Smart card 416 may also include an NFC tag. The NFC tag may include data associated with the smart card and the cardholder of the card.

Smart card 416 may perform a transaction with another smart card. As shown at 402, NFC capabilities may enable the cardholder to activate NFC communication on the smart card 416. An information controller, as shown at 404, may capture the amount of the transaction and the PIN. The cardholder may then be able to send and receive payment and authentication data to another smart card. The cardholder may authenticate himself as the cardholder by input of a PIN. Upon authentication, the cardholder of the recipient of the transaction may capture the PIN and a transaction amount.

The NFC controller may be configured to activate NFC communication. The activation of the NFC communication may enable sending and receiving user payment and authentication data.

The NIC 420 may enable a wireless connection, as shown at 406 for the microprocessor 410 to connect to the payment network via a WI-FI device 408. The payment network may include the sender's bank 412 and the receiver's bank 414. In some embodiments, the payment network may also include the credit card issuer.

Figure 5:
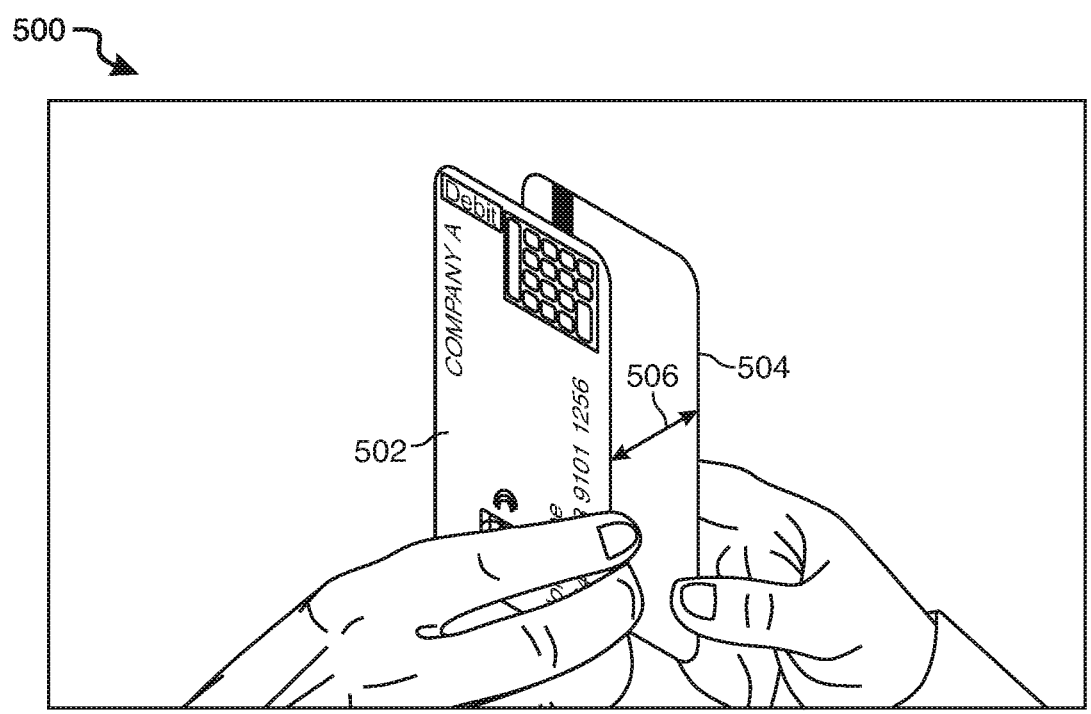
FIG. 5 shows an illustrative diagram in accordance with principles of the invention.

FIG. 5 shows an illustrative diagram 500 of a card-to-card direct communication. A cardholder of the first active smart card may position his card in a first position as shown at 502. The cardholder of the second active smart card may position his card in a second position, as shown at 504. The two positions may be within close proximity of each other. In order to perform a transaction and enable a two-way communication between the two cards, the distance between the two cards may be a distance ranging between zero and up to approximately 10 cm, as shown at 506. It should be appreciated that exemplary NFC communication ranges may be 0-1 inches, 0-1.5 inches, 0-2 inches, 0-2.5 inches, 0-3 inches, 0-3.5 inches, 0-4 inches, 0-4.5 inches, 0-5 inches, or any other suitable range supported by NFC apparatus.

Figure 6:
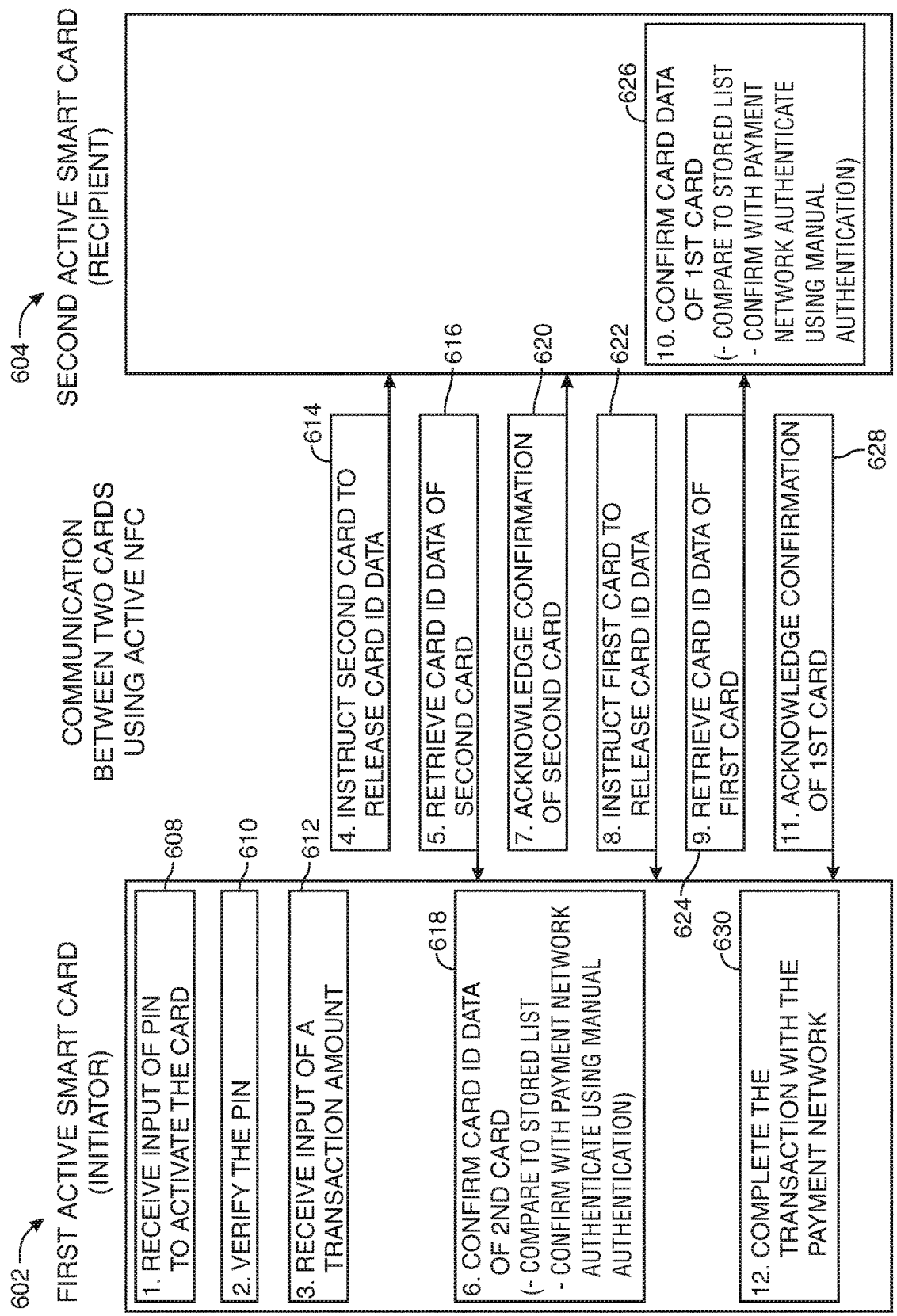
FIG. 6 shows an illustrative flowchart in accordance with principles of the invention.

FIG. 6 shows an illustrative flowchart 600 of a wireless communication between a first active smart card 602 and a second active smart card 604. The wireless communication may be leveraged to execute a transaction.

At step 1 (608), a cardholder of the first active smart card 602 may input a PIN into the keypad of the card. The PIN may enable activating the card for use in performing a transaction. The first active smart card 602 may verify the PIN, as shown at step 2 (610). The verifying may include comparing the inputted PIN to a pre-determined PIN stored on the first active smart card 602. If the PIN cannot be verified, the cardholder may not be enabled to activate the card for use.

Following verification of the PIN, the first active smart card 602 may receive input of a transaction amount, as shown at step 3 (612). At step 4 (614), card 602 may instruct second active smart card 604 to release card ID data. The instructing may be enabled using NFC technology embedded in the card. When the first and second active smart cards are within the range enabling NFC communication, the first active smart card 602 may be enabled to retrieve card ID data associated with the second active smart card 604, as shown at step 5 (616).

At step 6 (618), the first active smart card 602 may confirm the card ID data of the second active smart card 604. The card ID data may include non-sensitive identifying data, i.e.—cardholder name, address, account number. The card ID data of the second active smart card may be confirmed by comparing card ID data to data stored in a list of the first active smart card 602. The card ID data may also be confirmed by reaching out to the payment network for validation. The card ID data may also be confirmed by a manual authentication. When the two active smart cards are within NFC enabled range, card ID data associated with the second active smart card may be displayed on the display of the first active smart card. The first active smart card may be enabled, such that a cardholder can confirm that the card ID data of the second active smart card is accurate and confirm execution of the transaction.

Following confirmation of the accuracy of the second active smart card 604, the first active smart card 602 may acknowledge confirmation as shown at step 7 (620). The second active smart card 604 may then instruct the first active smart card 602 to release card ID data, as shown at step 8 (622). At step 9 (624), second active smart card 604 may retrieve card ID data associated with the first active smart card 602. At step 10 (626), second active smart card 604 may confirm the card ID data of the first active smart card 602. At step 11 (628), second active smart card 604 may acknowledge confirmation of the card ID data associated with the first active smart card 602.

It should be appreciated that steps 6-11 (618-628) may be steps performed as an added layer of security. The acknowledging may confirm that the appropriate cards are being used in performing the transaction. Steps 6-11 may be considered a 'handshake', i.e.—an automated process of negotiation between the two communicating smart cards through the exchange of information that establishes the protocols of a communication link at the start of the communication, before full communication begins. This handshake may be between the first active smart card 602 and the second active smart card 604.

At step 12 (630), once the card ID data is confirmed to be accurate, the transaction may be completed with the payment network.

Thus, methods and apparatus for performing a card-to-card direct contactless transaction is provided. Persons skilled in the art will appreciate that the present invention can be practiced by other than the described embodiments, which are presented for purposes of illustration rather than of limitation, and that the present invention is limited only by the claims that follow.

What is claimed is:

1. A method for performing a card-to-card direct contactless transaction between a first active smart card and a second active smart card, the method comprising:
   activating the first active smart card in order to perform a transaction with the second active smart card, each of the first active smart card and second active smart card comprising an active near-field communication ("NFC") reader, the activating comprising:
      receiving input of a personal identification number ("PIN") on a keypad located on the first active smart card;
      verifying, using a microprocessor embedded in the first active smart card, the PIN being associated with the first active smart card; and
      in response to the verifying, receiving input of a transaction amount on the keypad and storing the transaction amount on the first active smart card;
   initiating a wireless NFC communication to perform the transaction between the first active smart card and the second active smart card, the initiating comprising positioning the first active smart card within a pre-determined distance to the second active smart card, the first active smart card being an initiator of a transaction, the second active smart card being the target of the transaction;
   ensuring a security of the wireless communication between the first active smart card and the second active smart card by:
      retrieving card ID data associated with the second active smart card, using the active NFC reader associated with the first active smart card;
      acknowledging and confirming the card ID data using a microprocessor embedded in the first active smart card by displaying a name of a cardholder associated with the second active smart card on the display of the first active smart card, and using the keypad, receiving authentication by the cardholder of the first active smart card; and
      using the active NFC reader associated with the second active smart card, retrieving card ID data associated with the first active smart card and the transaction amount, from the first active smart card; and
      acknowledging and confirming the card ID data associated with the first active smart card using a microprocessor embedded in the second active smart card by displaying a name of a cardholder associated with the first active smart card on the display of the second active smart card, and using the keypad, receiving authentication by the cardholder of the second active smart card; and
   in response to the acknowledging, completing the transaction by transferring a value of the transaction amount from the first active smart card to the second active smart card using the first active smart card and a payment network.

2. The method of claim 1 wherein the pre-determined distance of the positioning comprises positioning the first active smart card equal to or less than a distance of four inches from the second active smart card.

3. The method of claim 1 wherein the wireless communication between the first active smart card and the second active smart card is a peer-to-peer ("P2P") mode of communication.

4. The method of claim 3 wherein the P2P mode of communication comprises a two-way communication channel between the first active smart card and the second active smart card wherein:

when the card ID data from the first active smart card is being retrieved by the second active smart card, the active NFC reader in the first active smart card is in a passive state and the active NFC reader in the second active smart card, reading and processing the card ID data, is in an active state; and when the card ID data from the second active smart card is being retrieved by the first active smart card, the active NFC reader in the second active smart card is in a passive state and the active NFC reader in the first active smart card, reading and processing the card ID data is in the active state.

5. The method of claim 1 wherein the acknowledging and confirming further comprises:

for the first active smart card, comparing the card ID data to a list of card ID data stored on the first active smart card and verifying that the card ID data is included in the stored list; and for the second active smart card, comparing the card ID data to a list of card ID data stored on the second active smart card and verifying the card ID data is included in the stored list.

6. The method of claim 1 wherein the acknowledging and confirming further comprises communicating with the payment network to confirm a validity of the second smart card.

7. The method of claim 1 wherein prior to the activating of the first active smart card, the active NFC reader is powered-off.

8. The method of claim 1 wherein following the retrieving of the card ID data from the first active smart card to the second active smart card, the method further comprises activating the second active smart card by receiving input of a PIN associated with the second active smart card and verifying the PIN being associated with the second active smart card.

9. The method of claim 1 wherein following the completing of the transaction, the method further comprises:

receiving, using the active NFC reader on the second active smart card, a confirmation from the first active smart card of the completing of the transaction;

transmitting the confirmation from the microprocessor to a display on the keypad, via a display connector; and displaying, on the display, a message confirming a completion of the transaction.

10. A smart card contactless payment system, the system enabling a first active smart card to perform a transaction with a second active smart card, the first active smart card and the second active smart card having dimensions that conform to the ISO/IEC 7810 ID-1 standard, the dimensions being no greater than 86 millimeters×54 millimeters×0.8 millimeters, the system comprising:

the first and second active smart card, the first active smart card being an initiator of a transaction and the second active smart card being a recipient of the transaction, each of the first and second active smart card comprising:

an active near field communication ("NFC") reader enabling a direct wireless communication between the first active smart card and the second active smart card when the first active smart card is within a pre-determined distance to the second active smart card;

an NFC tag for storing data, the NFC tag being a re-writable tag;

a nano wireless network interface card ("NIC") configured to enable establishing a wireless connection;

a microprocessor configured to enable processing, storing and transmitting card ID data;

a battery;

a keypad comprising a display and raised numerical keys, wherein a thickness of the first and second active smart card together with the raised numerical keys does not exceed the 0.8 millimeters, the keypad configured to accept input of a personal identification number and a transaction amount; and a display connector configured to intermediate between the keypad, the display and the microprocessor;

a Wi-Fi device configured to enable the NIC to establish the wireless connection; and a payment network in communication with the first and second active smart card via the Wi-Fi device; and wherein when the first active smart card is positioned within the pre-determined distance to the second active smart card, the system is configured to enable the communication between the first and second active smart card pursuant to the following steps:

retrieving card ID data associated with the second active smart card, using the active NFC reader associated with the first active smart card;

acknowledging and confirming the card ID data using the microprocessor embedded in the first active smart card by displaying a name of a cardholder associated with the second active smart card on the display of the first active smart card, and using the keypad, receiving authentication by the cardholder of the first active smart card;

using the active NFC reader associated with the second active smart card, retrieving from the first active smart card:

card ID data associated with the first active smart card; and a transaction amount inputted into the keypad of the first active smart card;

acknowledging and confirming the card ID data associated with the first active smart card using a microprocessor embedded in the second active smart card by displaying a name of a cardholder associated with the first active smart card on the display of the second active smart card, and using the keypad, receiving authentication by the cardholder of the second active smart card; and in response to the acknowledging, completing the transaction by transferring a value of the transaction amount from the first active smart card to the second active smart card using the first active smart card and the payment network.

11. The system of claim 10 wherein the payment network comprises a payment gateway, an acquirer's bank and an issuer's bank, the payment network configured to receive card ID data from the first active smart card, process the card ID data and complete the transaction.

12. The system of claim 10 further comprising a solar pad configured to charge the battery.

13. The system of claim 10 wherein the direct communication is independent of a point-of-sale ("POS") device.

14. The system of claim 10 wherein the pre-determined distance comprises positioning the first active smart card equal to or less than a distance of four inches from the second active smart card.

15. The system of claim 10 wherein the wireless communication between the first active smart card and the second active smart card is a peer-to-peer ("P2P") mode of communication.

16. The system of claim 15 wherein the P2P mode of communication comprises utilizing the first active smart card as a passive NFC device when transferring the card ID data and the second active smart card as an active NFC device when receiving and processing the card ID data.

* * * * *